US012794924B2

(12) United States Patent
Pagan et al.

(10) Patent No.: US 12,794,924 B2
(45) Date of Patent: Nov. 10, 2026

(54) WORKFLOW PENETRATION TESTING

(71) Applicant: International Business Machines Corporation, Armonk, NY (US)

(72) Inventors: Daniel Alan Pagan, Athens, OH (US); Yannick Bedard, Vero Beach, FL (US); Michael Mitchell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 17/656,005

(22) Filed: Mar. 23, 2022

(65) Prior Publication Data

US 2023/0308466 A1 Sep. 28, 2023

(51) Int. Cl.
*H04L 9/00* (2022.01)
*H04L 9/40* (2022.01)
*H04L 43/50* (2022.01)

(52) U.S. Cl.
CPC .......... *H04L 63/1433* (2013.01); *H04L 43/50* (2013.01); *H04L 63/1416* (2013.01); *H04L 63/1425* (2013.01); *H04L 63/1466* (2013.01); *H04L 63/20* (2013.01)

(58) Field of Classification Search
CPC ............................ H04L 63/1433; H04L 43/50
USPC ............................................................ 726/22
See application file for complete search history.

(56) References Cited

U.S. PATENT DOCUMENTS 9,305,168 B2 4/2016 Brucker
10,841,329 B2 11/2020 Valecha
11,036,868 B2 6/2021 Sheridan
11,138,033 B1 * 10/2021 Sem .......................... G06F 9/54
11,394,740 B1 * 7/2022 Shake .................... G06N 20/00
11,558,414 B1 * 1/2023 Nguyen .............. H04L 63/1433
12,088,609 B1 * 9/2024 Boteanu .............. H04L 63/1425
2003/0014669 A1 1/2003 Caceres
2011/0035803 A1 * 2/2011 Lucangeli Obes .......................... H04L 63/1433 726/25
2017/0006055 A1 * 1/2017 Strom ..................... G06F 30/20
2017/0019421 A1 * 1/2017 Hebert .................. G06F 21/577
(Continued)

OTHER PUBLICATIONS

Argo Workflows, Downloaded Dec. 29, 2021, 3 Pgs., <https://argoproj.GitHub.io/argo-workflows/>.
(Continued)

*Primary Examiner* — Christopher J Brown
(74) *Attorney, Agent, or Firm* — Seed Intellectual Property Law Group LLP

(57) ABSTRACT

Embodiments are disclosed for a method. The method includes receiving a submitted workflow for penetration testing. The submitted workflow includes execution instructions for a multiple penetration testing tools. The method also includes providing the submitted workflow for a workflow runtime manager. Additionally, the method includes generating, by the workflow runtime manager, a first worker container that executes a first penetration testing tool of the penetration testing tools, using a first runtime. The method further includes executing the first penetration testing tool. Also, the method includes generating, by the workflow runtime manager, a second worker container that executes a second penetration testing tool of the penetration testing tools, using a second runtime. Further, the method includes executing the second penetration testing tool.

20 Claims, 6 Drawing Sheets

(56) References Cited

U.S. PATENT DOCUMENTS

| | | | | |
|---|---|---|---|---|
| 2018/0349183 | A1* | 12/2018 | Popovic | G06F 9/4881 |
| 2019/0068630 | A1 | 2/2019 | Valecha | |
| 2019/0378052 | A1* | 12/2019 | Badhwar | G06N 3/0455 |
| 2019/0391845 | A1* | 12/2019 | Gasser | G06F 9/4887 |
| 2021/0279088 | A1* | 9/2021 | Kochavara | G06F 9/45558 |
| 2022/0198002 | A1* | 6/2022 | Caciulescu | G06F 21/604 |
| 2022/0201042 | A1* | 6/2022 | Crabtree | G06F 16/2477 |

OTHER PUBLICATIONS

Bachmann et al., "Developing Secure Software: A Holistic Approach to Security Testing." Datenschutz und Datensicherheit (DuD) 38 (Apr. 2014) , doi:10.1007/s11623-014-0102-0, 5 Pgs.

Bertolino et al. "Coverage-based test cases selection for XACML policies." 2014 IEEE Seventh International Conference on Software Testing, Verification and Validation Workshops, IEEE Computer Society, DOI10.1009/ICSTW.2014.49, 2014, 10 Pgs.

Felderer et al. "Security testing: A survey." Advances in Computers. vol. 101. Elsevier, 2016. 43 Pgs.

IBM Security, YouTube, Downloaded Dec. 28, 2021, 4 Pgs. <https://www.youtube.com/ibmsecurity>.

IBM X-Force Exchange, "Research, Collaborate and Act on Threat Intelligence", Downloaded Jan. 13, 2022, 3 Pgs. <https://exchange.xforce.ibmcloud.com/>.

IBM, "IBM Security Community", Downloaded Dec. 28, 2021, 11 Pgs. <https:www.ibm.com/security/community>.

IBM, "X-Force Red Offensive Security Services", Downloaded on Dec. 28, 2021, <hptts://www.ibm.com/security/services/offensive-security-services.com>, 7 Pgs.

Mei et al., Data Flow Testing of Service-Oriented Workflow Applications*, ICSE '08, May 10-18, 2008, ACM978-1-60558-079-1/08/05, 10 Pgs.

Mell et al., "The NIST Definition of Cloud Computing", National Institute of Standards and Technology, Special Publication 800-145, Sep. 2011, 7 pages.

Pentera, Automated Penetration Testing With a Click of a Button, Downloaded Jan. 13, 2022, 6 Pgs, , https:www.pentera.io/>.

Software Vulnerabilities, "How LOG4I Vulnerability Could Impace You", Security Intelligence—Cybersecurity Analysis . . . Dec. 18, 2021, 14 Pgs. <https://securityintelligence.com/>.

Twitter; "X-Force Red (@Xforcered)", Downloaded Dec. 28, 2021, <https://twitter.com/xforcered>, 15 Pgs.

* cited by examiner

WORKFLOW PENETRATION TESTING

BACKGROUND

The present disclosure relates to penetration testing, and more specifically, to workflow penetration testing in the cloud.

Penetration testing can refer to the practice of ethical hackers attempting to break into the computer systems of their clients and/or employers. However, current attempts at penetration testing may use local desktop and laptop computers, which may not provide adequate processing power and memory for relatively large penetration testing tasks. Additionally, penetration testing can involve manual labor and be relatively expensive.

SUMMARY

Embodiments are disclosed for a method. The method includes receiving a submitted workflow for penetration testing. The submitted workflow includes execution instructions for multiple penetration testing tools. The method also includes providing the submitted workflow for a workflow runtime manager. Additionally, the method includes generating, by the workflow runtime manager, a first worker container that executes a first penetration testing tool of the penetration testing tools, using a first runtime. The method further includes executing the first penetration testing tool. Also, the method includes generating, by the workflow runtime manager, a second worker container that executes a second penetration testing tool of the penetration testing tools, using a second runtime. Further, the method includes executing the second penetration testing tool.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
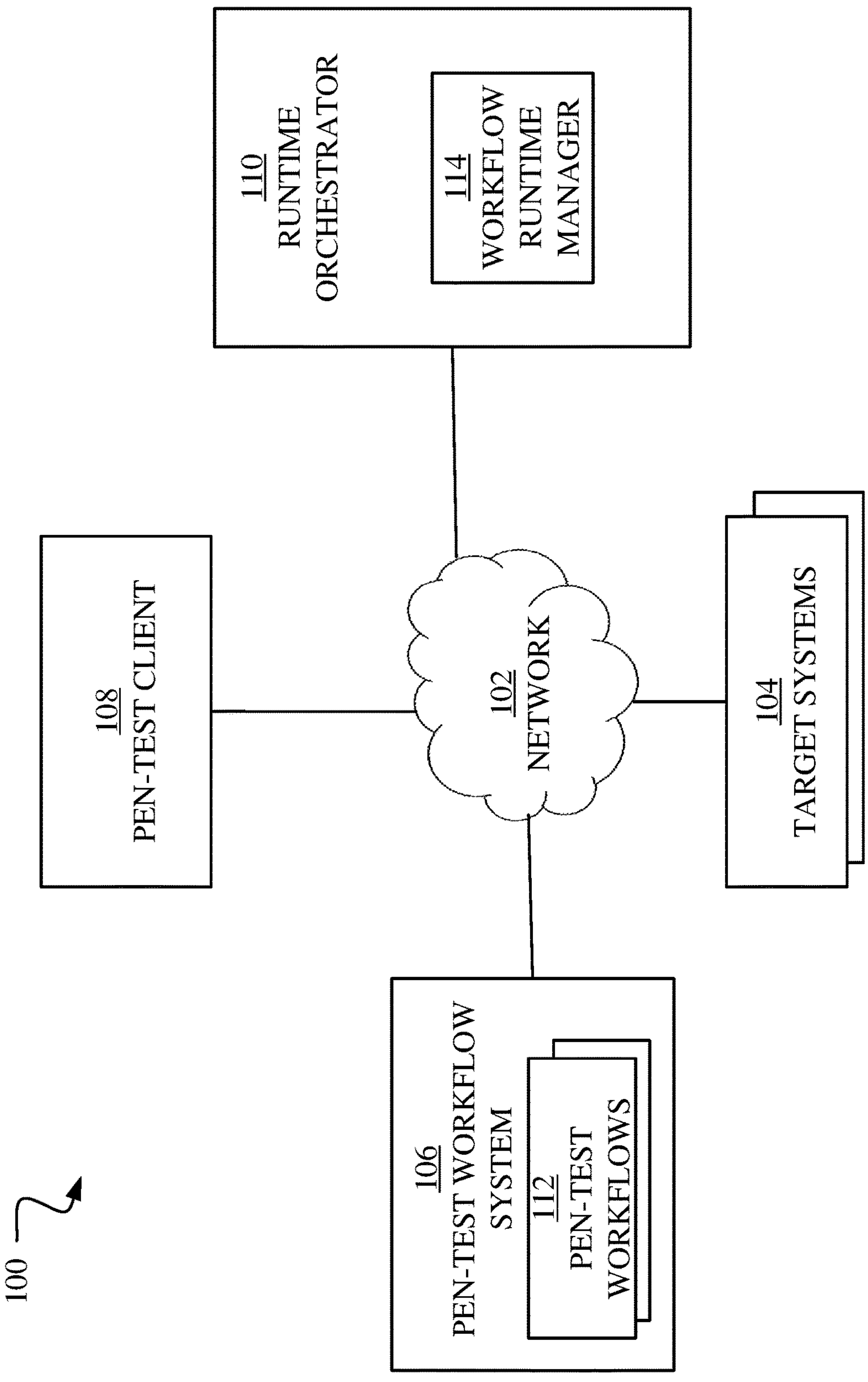
FIG. 1 is a block diagram of an example system for workflow penetration testing, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, penetration testing can involve manual labor and be relatively expensive. While some of the manual labor may be automated, this can involve relatively, large, monolithic, scripts that may be challenging to maintain. Further, these scripts may use different scripting languages, and incorporate a variety of different tools, which may lead to fragmentation, and make the scripts unusable to anyone but the author. Also, the authors may not provide support or documentation, and the scripts may not incorporate practical error handling. Accordingly, such scripts may be challenging to adapt in the fast-paced industry of cybersecurity, and unnecessarily raise the barrier of entry to newcomers in the industry (e.g., entry-level penetration testers, who may not have the expertise to use and/or maintain somebody else's script).

Accordingly, some embodiments of the present disclosure can provide a workflow system that executes tools as individual nodes. Further, the workflows can be maintainable, modular, aggregate errors, and adaptable to any language. The workflow system can compose nodes in a way that allows for separation of responsibilities. In this way, some embodiments of the present disclosure may enable a workflow designer to compose workflows like building blocks. A developer may build a workflow by composing nodes (e.g., tools). This composition of nodes can produce a script that runs the nodes as individual processes themselves. Further, the penetration tester may customize the workflow to specific environmental parameters (e.g., client-specific parameters). Additionally, some embodiments of the present disclosure can be deployed on the cloud, which can provide greater computational resources than typical local machines. Further, some embodiments of the present disclosure may incorporate runtime abstraction, to support different client environments (e.g., virtual private network [VPN], direct internet, cloud, mainframe, and the like). Also, some embodiments of the present disclosure can provide data collection. Accordingly, some embodiments of the present disclosure can use collected data to perform data analysis and machine learning. With machine learning, it may be possible to learn what tools and/or nodes work better against a given target, based on their respective industries. For example, machine learning may identify what tools are more effective against networks for banks, energy companies, online retailers, and so on. While this is one example of insights possible with machine learning, other insights are also possible with respect to the relationships between tools, workflows, and target systems.

Further, such data collection can make it possible to provide compliance functionality. Compliance functionality can enable some embodiments of the present disclosure to provide data stewardship in accordance with the applicable statutes, laws, treaties, and the like. Some embodiments of the present disclosure can provide data purging as a further aspect of the compliance functionality.

In this way, some embodiments of the present disclosure can improve the functioning of penetration testing technology, wherein workflow experts can compose penetration test tools of varying languages into modular workflows that penetration testers can use without prerequisite knowledge or skills in the relevant languages. Further, the workflows can execute in a cloud environment, having greater computational resources than the typical local computing devices that current penetration testers use. Additionally, some embodiments of the present disclosure can provide a run-time orchestration system that enables the execution of the tools in their respective run-time environments, and provides error-handling that enables the workflows to come to a controlled finish of their execution despite an error-triggering event in the execution of a tool.

FIG. 1 is a block diagram of a system 100 for workflow penetration testing in the cloud, in accordance with some embodiments of the present disclosure. The system 100 includes a network 102, target systems 104, pen-test workflow system 106, pen-test client 108 and runtime orchestrator 110. The network 102 can be one or a collection of networks, such as local area networks and/or wide area networks. In some embodiments, the network 102 can be the Internet.

The target systems 104 can be collections of computer networks and connected components in hardware and software. The managers of the target systems 104 may employ penetration testers to identify vulnerabilities, risks, and the like of the target systems 104. Accordingly, the penetration testers may use the pen-test workflow system 106 to develop and maintain pen-test workflows 112 that automatically perform penetration testing on the target systems 104. The pen-test workflow system 106 may be a workflow management system that streamlines routine penetration testing processes. For example, a penetration tester may create a pen-test workflow 112 that automatically executes a sequence of penetration testing tools. For example, a first tool may perform reconnaissance to identify vulnerable login credentials. A second tool may perform resource development to compromise the login credentials. A third tool may exploit compromised login credentials, and so on. Further, each of the penetration testing tools may use a different runtime. Each runtime may have the same set of installed primitives (e.g., Python, Java Virtual Machine, and the like). However, the runtimes may abstract over the method of connection to the network of the target system 104. For example, the pen-test workflow system 106 may connect to a target system 104 using a VPN connection from the client. In this example, the VPN connection can represent a runtime. Other examples of runtimes include scenarios where the client specifies that the pen-tester use remote desktop protocol (RDP), secure shell protocol (SSH), or a jumphost. The pen-test workflow system 104 may thus enable the installation of pen-test workflows 112 for specific runtimes. For example, a specific client environment can provide a suitable location to execute the pen-test workflow 112 from, and record the results in the cloud. In this way, the pen-test workflow system 106 may provide solutions to the network isolation and segmentation issues inherent to workflow and tool standardization.

The pen-test client 108 can include a user interface, command line interface, and the like, that enables the penetration tester to access the pen-test workflow system 106. In this way, the penetration tester can identify, select, compose, and maintain pen-test workflows 112 for penetration testing. Further, in some embodiments of the present disclosure, the penetration tester can modify the pen-test client 108 to provide information about workflow execution and/or additional functionality.

The runtime orchestrator 110 can provide a submitted workflow to workflow runtime manager 114, which can execute the submitted workflow. Accordingly, as each tool and/or script executes (as indicated in the submitted workflow), the runtime orchestrator 110 can pass requests and/or data between the workflow runtime manager 114 and the relevant runtime managers and/or connection method.

The workflow runtime manager 114 may provide an ability to implement a runtime in a manner that makes sense for the client or target system. In contrast to current systems where pen-testers may view their interface with the target system 104 as a single environment, some embodiments of the present disclosure can provide the ability to switch the connection method to the target system 104 within a single workflow. Thus, the workflow runtime manager 114 can use different runtimes for each execution of a single pen-test workflow 112. Thus, it may be possible to re-use workflows agnostically of their runtime environments in order to provide portability to client solutions migrating between infrastructures and environments. In current systems, switching the connection method within a single pen-test workflow 112 is a challenge for penetration testing in practice. This is useful for non-academic applications of this technology like a client using a VPN or an unconventional token setup, for example. Further, having the runtime interface in this way also allows for different ways of executing a pen-test workflow 112. Accordingly, some embodiments of the present disclosure can provide an improved robustness and/or modularity, in comparison to current systems for penetration testing.

Figure 2:
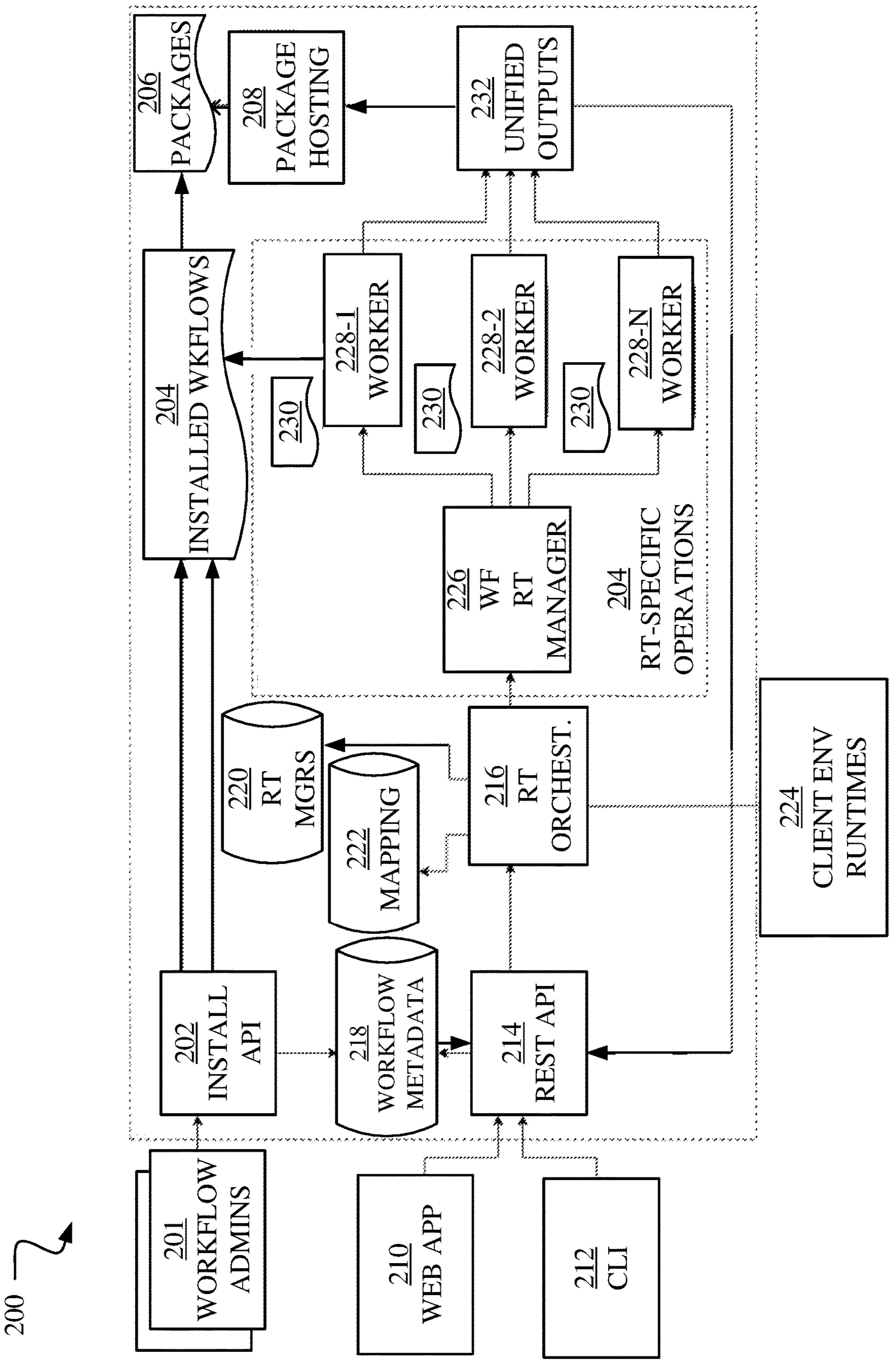
FIG. 2 is a block diagram of an example system for workflow penetration testing, in accordance with some embodiments of the present disclosure.

FIG. 2 is a block diagram of a system 200 for workflow penetration testing in the cloud, in accordance with some embodiments of the present disclosure. The system 200 includes a network (not shown). The network can be one or a collection of networks, such as local area networks and/or wide area networks. In some embodiments, the network can be the Internet.

The workflow admins 201 can provide a user interface for developing and/or installing workflows for penetration testing. The installation management API 202 handles what kinds of workflows are installed in the installed workflows 204. An installed workflow 204 may be an ordered sets of tools to run, the tools themselves, and a formalization of the tool's specific inputs and outputs. The installation management API 202 may install a workflow by merely making it available for penetration testers to use. For example, the installation management API 202 may provide a user interface that enables someone (e.g., a workflow developer) to dynamically add new workflows to the pen-test workflow system 106. Accordingly, the installation management API 202 may make these new workflows available for penetration testers to use. Thus, the installed workflow 204 may resemble the work of a penetration tester. For example, a workflow can be a directed, acyclic graph of tools. In this way, the installed workflows 204 may enable the efficient, parallel execution of workflows. Because the installed workflows 204 can represent standardized methodologies, it becomes possible to execute installed workflows 204 at scale independent of one another. The tools may include, for example, scanners, local exploits, remote exploits, parsers, generators (e.g., for generating random passwords), and the like. Additional tools may include, for example, a connection setup to traverse a network. For example, such a tool might set up an SSH tunnel that other tools use to reach the target system 104. In some embodiments of the present disclosure, the workflows can make reference to penetration tools in the packages 206.

The packages 206 may include a set of executable penetration tools, and scripts. The package hosting 208 can provide a dependency management system for the packages 206. In other words, the package hosting 208 can provide a way to compose the penetration tools and scripts into the installed workflows 204. In this way, the packages 206 may be similar to a database of programs that package hosting 208 composes.

The web application (app) 210 and command line interface (CLI) 212 can provide interfaces that the pen-testers use to select and submit the installed workflows 204 for execution. The web app 210 can be a web page, for example, with a form submission to initiate installed workflows 204, check the execution progress, and view results of the execution. The CLI 212 can be a text-based interface with an operating system. Using the CLI 212, the pen-tester may manipulate datasets and submit executables for execution. In these ways, the web app 210 and CLI 212 can provide an end user interface for the pen-testers.

The representational state transfer (REST) API 214 can provide a back-end that the pen-tester can use to automate job submission to the runtime (RT) orchestrator (ORCHEST) 216. Accordingly, the web app 210 can retrieve information about workflows from the REST API 214. In this way, the REST API 214 can directly give finer-grained control to pen-testers over what information they view about executing workflows. For example, such information may include a polling on the status of a job. Additional functionality can include registering some form of callback to react to a predetermined workflow event (e.g., abnormal termination). Further, the REST API 214 may use the workflow metadata 218 for information that is useful for the execution of the respective workflow being submitted. The workflow metadata 218 may be a persistent datastore that include information about the installed workflows 204. Such information can include a description, name, icon, instructions to show users about how to use the workflow, and the like. Additionally, the arrow from installation management API 202 to workflow metadata 218 can represent part of the workflow installation process, wherein the installation management API 202 may store the metadata. Further, the arrow from workflow metadata 218 to the REST API 214 can represent instances wherein the REST API 214 may fetch workflow metadata 218 to serve user requests from the web app 210 or CLI 212.

The runtime orchestrator 216 can identify the runtimes of the tools indicated in the submitted workflow. A runtime can run an installed workflow 204 as a job. However, because each of the installed workflows 204 can use a different runtime, the runtime orchestrator 216 may keep track of which jobs (e.g., installed workflows 204 that are currently running) are mapped to which runtimes, in the mapping 222. Thus, a pen-tester may query the REST API 214 for a job status with a job ID, and the runtime orchestrator 216 can use the job identifier and the mapping 222 to determine the runtime. The runtime orchestrator 216 thus can represent an abstraction layer that allows selecting the runtime manager 226 responsible for the worker 228. Workers 228 can exist in a variety of environments and the workflow runtime managers 226 are responsible for environment and/or worker-specific logic to ensure a stable and capable execution environment for an installed workflow 204.

The client environment (ENV) runtimes 224 can represent the networks of the target systems 104. Further, the workflow runtime manager 226 may query the determined runtime for the status of the requested job The runtime managers 220 can be a datastore of installed runtime managers. It is useful to persistently track runtimes in a cloud environment due to technical reasons (e.g., a cloud container could terminate randomly). Accordingly, it is useful to install the runtime in a datastore, from which the runtime orchestrator 216 can re-start the runtime. In the event that a workflow terminates with an error and/or crashes, the workflow runtime manager 226 can re-start the workflow where the workflow crashed. Further, the runtime orchestrator 216 can re-start the runtime using the relevant runtime manager 220. In this way, the concrete recording of runtime managers 220 allows the system 200 to operate with itself not needing to respond to dynamic coming and going of runtime managers 226.

As stated previously, the workflow runtime manager 226 may provide an ability to implement a runtime in a manner that makes sense for the target system 104. For example, the workflow runtime manager 226 may generate a worker 228 for each workflow to execute. The worker 228 may be a container that executes a single workflow. A container can be a standardized software unit that packages up its code and dependencies in order to execute efficiently on one of numerous potential computing environments. Executing a single workflow in one container is merely one possible technique for executing the installed workflows 204. However, other scenarios are possible, and dynamically configurable based on relationships between the runtime orchestrator 216 and workflow runtime manager 226. For example, the workflow runtime manager 226 may generate a worker 228 for each tool in a workflow, for groups of tools in a workflow, for multiple workflows, and the like. Thus, the worker 228 can be a lightweight, standalone, executable package of software configured to run an application: code, runtime, system tools, system libraries and settings.

Additionally, the worker 228 may be associated with a persistent volume claim { reference character 230}. The persistent volume claims {reference character 230} may be copied directly from the installed workflows 204, for example. In this way, the persistent volume claims {reference character 230} may ensure that the installed workflow 204 has its specified resources. A worker 228 gets loaded up with the exact same directory structure as the workflow designer had when they installed the workflow into 204. In this example, the workflow runtime manager 226 creates three workers 228 (e.g., 228-1, 228-2, and 228-3), one for each submitted workflow. However, the runtime interface being well-defined like makes it possible to configure the workers 228 more flexibly. For example, in some embodiments of the present disclosure, the workflow runtime manager 226 can generate one worker 228 per tool for a more granular approach. Alternatively, in some embodiments of the present disclosure, the workflow runtime manager 226 can generate one worker 228 for multiple submitted workflows, for a less granular approach.

Additionally, the workers 228 can provide outputs from all of the workers 228 into a unified outputs 232. Accordingly, the REST API 214 can provide access to the unified outputs 232 for the purpose of display or other presentation to a penetration tester or other user.

Figure 3:
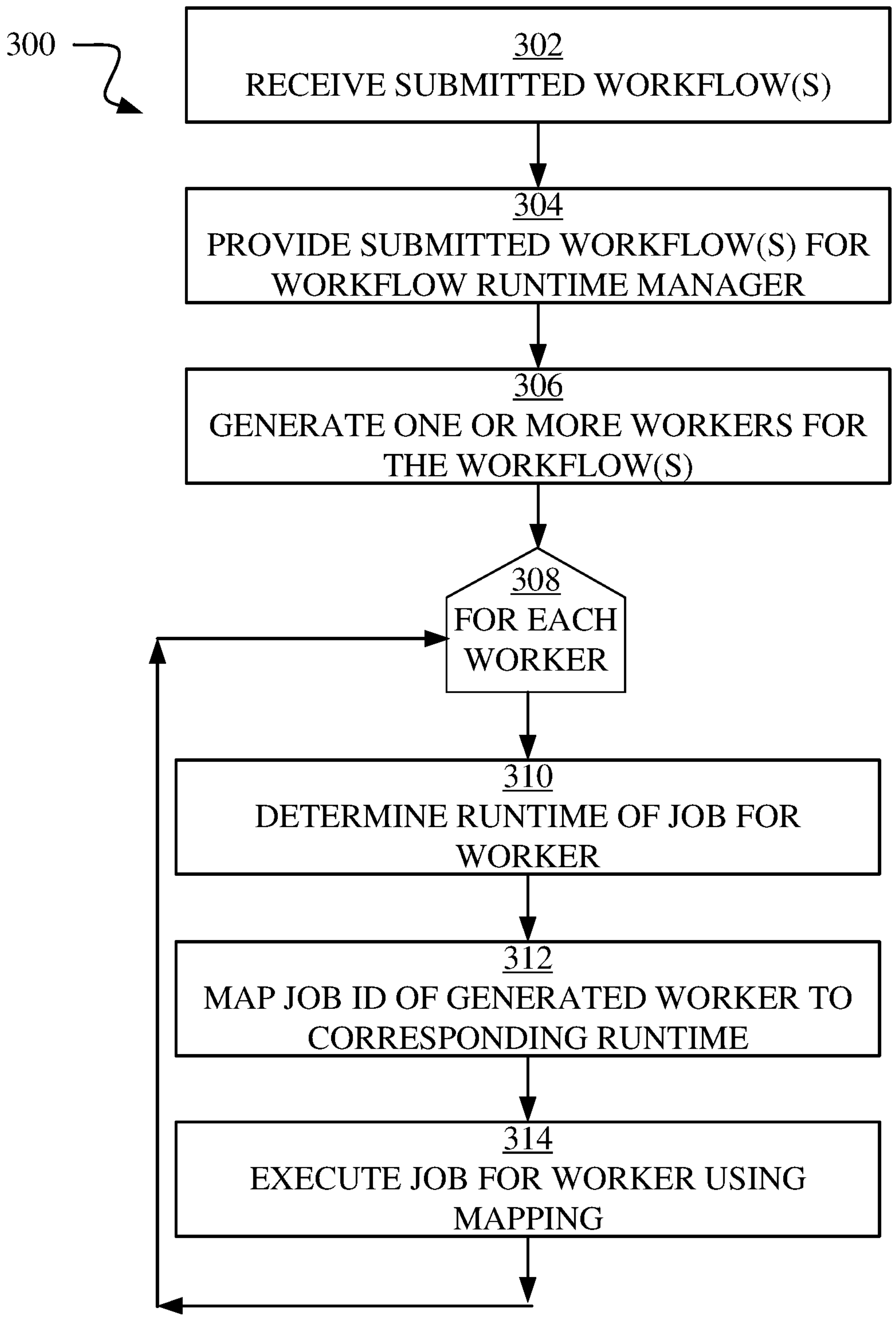
FIG. 3 is a process flow chart of a method for automating penetration testing in the cloud, in accordance with some embodiments of the present disclosure.

FIG. 3 is a process flow chart of a method 300 for workflow penetration testing, in accordance with some embodiments of the present disclosure. Additionally, the runtime orchestrator 216 and the workflow runtime manager 226 may perform the method 300.

At operation 302, the runtime orchestrator 216 can receive a submitted workflow from the REST API 214. The submitted workflow can include multiple penetration testing tools.

At operation 304, the runtime orchestrator 216 can provide the submitted workflow to the workflow runtime manager 226. The tools of the submitted workflow may each include a different runtime and connection type.

At operation 306, the workflow runtime manager 226 can generate one or more workers, such as the workers 228, to execute at least a portion of the workflow. As stated previously, the workflow runtime manager 226 can generate one worker 228 for each tool or each submitted workflow. Alternatively, the workflow runtime manager 226 may generate one worker 228 for multiple submitted workflows.

Further, for each generated worker 228, the runtime orchestrator 216 and workflow runtime manager 226 may perform operations 308-314.

At operation 310, the runtime orchestrator 216 can determine the runtime of the job for the generated worker 228. Determining the runtime of the job can include determining the connection type for one or more tools associated with the generated worker 228.

At operation 312, the runtime orchestrator 216 may map the job id of the generated worker to the runtime of the currently executing tool. Additionally, the runtime orchestrator 216 may store the mapping in the mapping 222.

At operation 314, the generated worker 228 may execute the job for the generated worker 228 based on the mapping. Executing the job can include executing the tool(s) for the generated worker 228. Further, executing the job can include processing requests for data from the REST API 214. The requests from the REST API 214 can include requests for data about the status of the generated worker 228. Accordingly, the runtime orchestrator 216 and workflow runtime manager 224 can determine and provide such data for the REST API 214.

Figure 4:
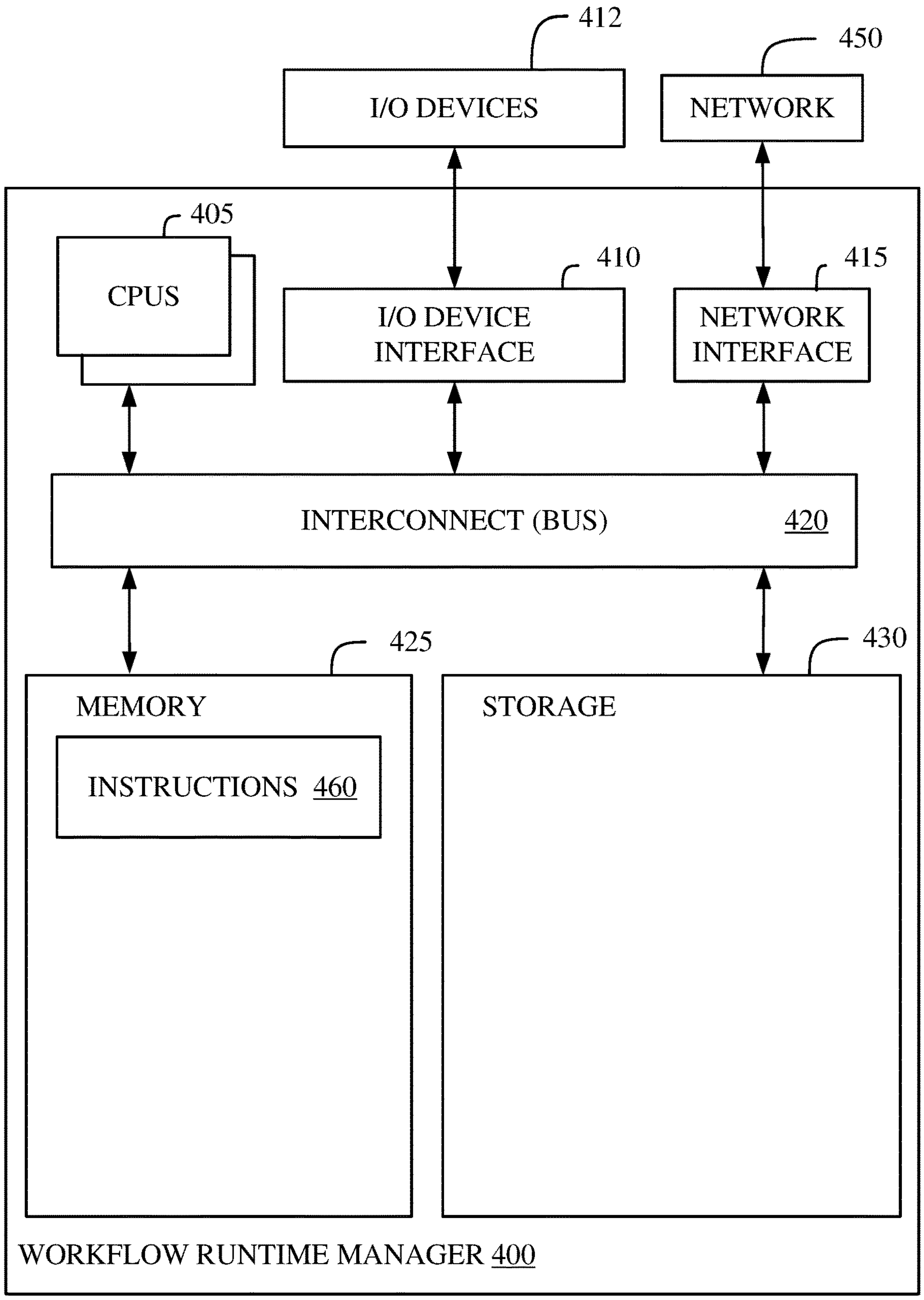
FIG. 4 is a block diagram of an example workflow runtime manager, in accordance with some embodiments of the present disclosure.

FIG. 4 is a block diagram of an example workflow runtime manager 400, in accordance with some embodiments of the present disclosure. In various embodiments, the workflow runtime manager 400 is similar to the workflow runtime manager 114 and can perform the method described in FIGS. 3 and/or the functionality discussed in FIGS. 1-2. In some embodiments, the workflow runtime manager 400 provides instructions for the aforementioned methods and/or functionalities to a client machine such that the client machine executes the method, or a portion of the method, based on the instructions provided by the workflow runtime manager 400. In some embodiments, the workflow runtime manager 400 comprises software executing on hardware incorporated into a plurality of devices.

The workflow runtime manager 400 includes a memory 425, storage 430, an interconnect (e.g., BUS) 420, one or more CPUs 405 (also referred to as processors 405 herein), an I/O device interface 410, I/O devices 412, and a network interface 415.

Each CPU 405 retrieves and executes programming instructions stored in the memory 425 or the storage 430. The interconnect 420 is used to move data, such as programming instructions, between the CPUs 405, I/O device interface 410, storage 430, network interface 415, and memory 425. The interconnect 420 can be implemented using one or more busses. The CPUs 405 can be a single CPU, multiple CPUs, or a single CPU having multiple processing cores in various embodiments. In some embodiments, a CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 4D heterogeneous integration, 3D system in package (3DSiP), and/or package on package (PoP) CPU configurations). Memory 425 is generally included to be representative of a random access memory (e.g., static random access memory (SRAM), dynamic random access memory (DRAM), or Flash). The storage 430 is generally included to be representative of a non-volatile memory, such as a hard disk drive, solid state device (SSD), removable memory cards, optical storage, and/or flash memory devices. Additionally, the storage 430 can include storage area-network (SAN) devices, the cloud, or other devices connected to the workflow runtime manager 400 via the I/O device interface 410 or to a network 450 via the network interface 415.

In some embodiments, the memory 425 stores instructions 460. However, in various embodiments, the instructions 460 are stored partially in memory 425 and partially in storage 430, or they are stored entirely in memory 425 or entirely in storage 430, or they are accessed over a network 450 via the network interface 415.

Instructions 460 can be processor-executable instructions for performing any portion of, or all of, any of the methods described in FIGS. 3 and/or the functionality discussed in FIGS. 1-2.

In various embodiments, the I/O devices 412 include an interface capable of presenting information and receiving input. For example, I/O devices 412 can present information to a listener interacting with workflow runtime manager 400 and receive input from the listener.

The workflow runtime manager 400 is connected to the network 450 via the network interface 415. Network 450 can comprise a physical, wireless, cellular, or different network.

In some embodiments, the workflow runtime manager 400 can be a multi-user mainframe computer system, a single-user system, or a server computer or similar device that has little or no direct user interface but receives requests from other computer systems (clients). Further, in some embodiments, the workflow runtime manager 400 can be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary workflow runtime manager 400. In some embodiments, however, individual components can have greater or lesser complexity than as represented in FIG. 4, components other than or in addition to those shown in FIG. 4 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
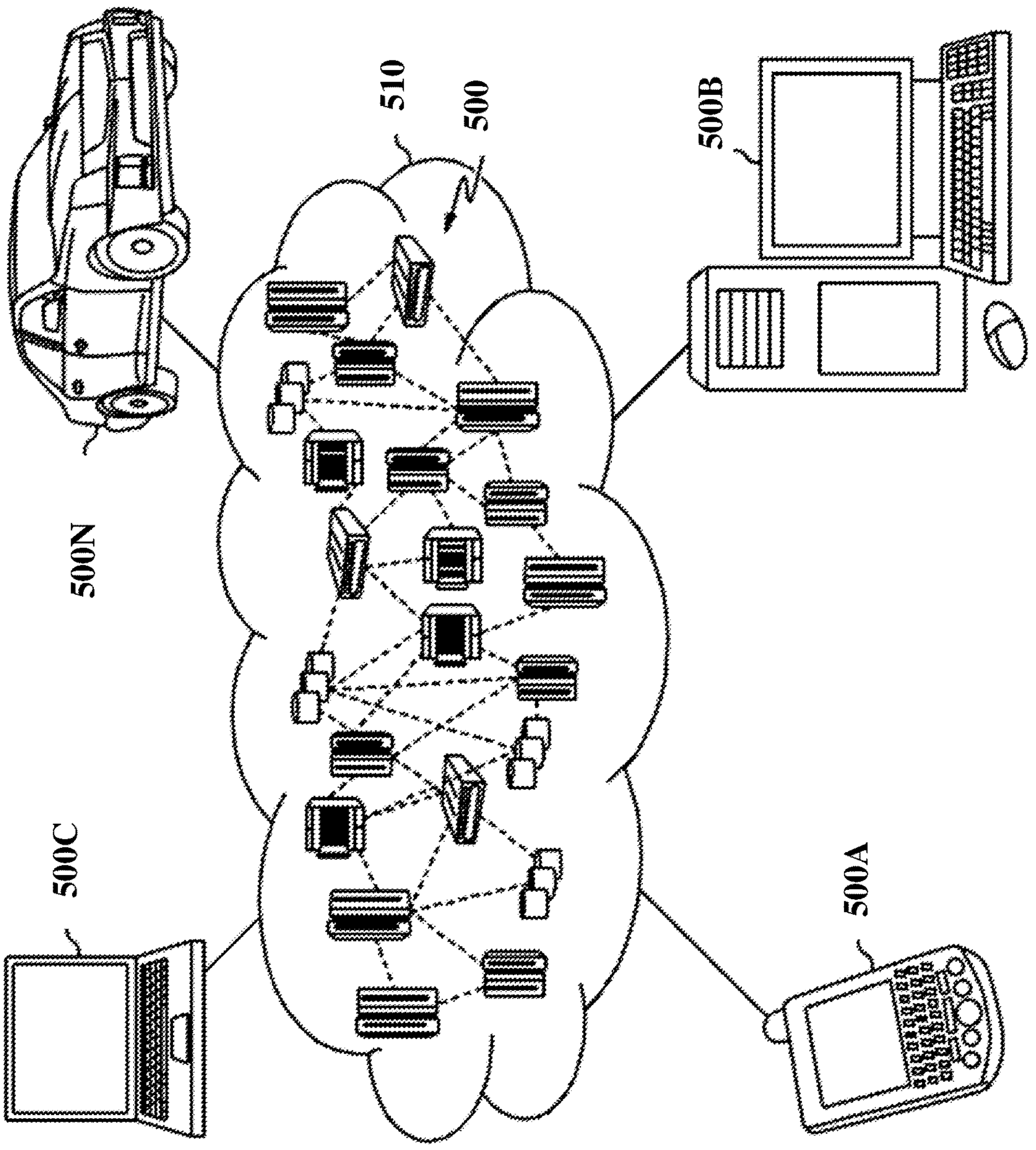
FIG. 5 is a cloud computing environment, according to some embodiments of the present disclosure.

FIG. 5 is a cloud computing environment 510, according to some embodiments of the present disclosure. As shown, cloud computing environment 510 includes one or more cloud computing nodes 500. The cloud computing nodes 500 can perform the methods described in FIGS. 2-5 and/or the functionality discussed in FIG. 1. Additionally, cloud computing nodes 500 can communicate with local computing devices used by cloud consumers, such as, for example, personal digital assistant (PDA) or cellular telephone 500A, desktop computer 500B, laptop computer 500C, and/or automobile computer system 500N. Further, the cloud computing nodes 500 can communicate with one another. The cloud computing nodes 500 can also be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
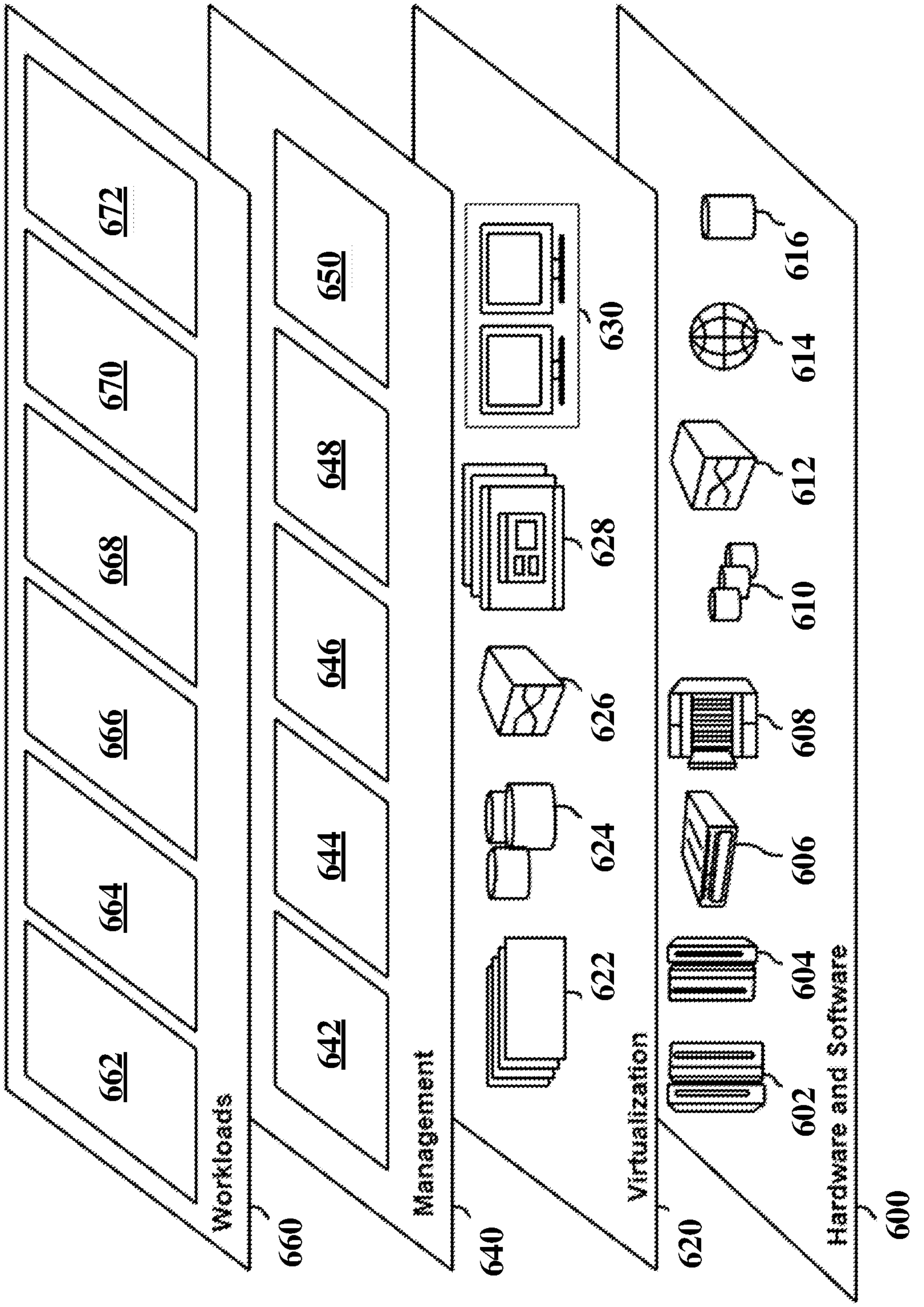
FIG. 6 is a set of functional abstraction model layers provided by cloud computing environment, according to some embodiments of the present disclosure, is shown.

FIG. 6 is a set of functional abstraction model layers provided by cloud computing environment 510 (FIG. 5), according to some embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities can be provided: virtual servers 622; virtual storage 624; virtual networks 626, including virtual private networks; virtual applications and operating systems 628; and virtual clients 630.

In one example, management layer 640 can provide the functions described below.

Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service level management 648 can allocate suitable processing power and memory to process static sensor data. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment can be utilized. Examples of workloads and functions which can be provided from this layer include: mapping and navigation 662; software development and lifecycle management 664; virtual classroom education delivery 666; data analytics processing 668; transaction processing 670; and workflow runtime manager 672.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:

a computer processing circuit; and a computer-readable storage medium storing instructions, which, when executed by the computer processing circuit, are configured to cause the computer processing circuit to perform a method comprising:

receiving a submitted workflow for penetration testing, wherein the submitted workflow comprises execution instructions for a plurality of penetration testing tools on an infrastructure;

providing the submitted workflow for a workflow runtime manager;

creating individual nodes adaptable to operate on different systems;

customizing a workflow using the individual nodes needed for a penetration test on the infrastructure wherein workflow executes script that runs the nodes as individual processes;

deploying the workflow on the infrastructure in a cloud environment;

generating, by the workflow runtime manager, a first worker container that executes a first penetration testing tool of the plurality of penetration testing tools, using a first runtime, wherein the first penetration testing tool customizes workflow to needs of a client using remote desktop protocol;

executing the first penetration testing tool;

generating, by the workflow runtime manager, a second worker container that executes a second penetration testing tool of the plurality of penetration testing tools, using a second runtime;

associating, with each generated worker container, a persistent volume claim comprising resources of the submitted workflow such that the worker container executes with a same directory structure as the workflow; and executing the second penetration testing tool.

2. The system of claim 1, the method further comprising determining a connection type of the first penetration testing tool.

3. The system of claim 2, the method further comprising generating a connection for at least one penetration testing tool that is compatible with the connection type.

4. The system of claim 1, the method further comprising mapping a first job identifier of the first worker container to the first runtime.

5. The system of claim 1, the method further comprising:

receiving a request for a status of the first penetration testing tool;

determining the first runtime based on a mapped first job identifier; and providing a response to the request based on the determined first runtime.

6. The system of claim 1, the method further comprising:

determining that the first runtime has terminated before the first worker container terminates; and re-starting the first runtime.

7. The system of claim 6, the method further comprising re-starting the first penetration testing tool.

8. The system of claim 1, further comprising:

combining outputs from the plurality of generated worker containers into a unified output; and providing, via a representational state transfer (REST) application programming interface (API), access to the unified output for presentation to a penetration tester.

9. A computer-implemented method, comprising:

receiving a submitted workflow for penetration testing, wherein the submitted workflow comprises execution instructions for a plurality of penetration testing tools on an infrastructure;

providing the submitted workflow for a workflow runtime manager;

creating individual nodes adaptable to operate on different systems;

customizing a workflow using the individual nodes needed for a penetration test on the infrastructure wherein workflow executes script that runs the nodes as individual processes;

deploying the workflow on the infrastructure in a cloud environment; generating, by the workflow runtime manager, a first worker container that executes a first penetration testing tool of the plurality of penetration testing tools, using a first runtime, wherein the first penetration testing tool customizes workflow to needs of a client using remote desktop protocol;

executing the first penetration testing tool;

generating, by the workflow runtime manager, a second worker container that executes a second penetration testing tool of the plurality of penetration testing tools, using a second runtime;

associating, with each generated worker container, a persistent volume claim comprising resources of the submitted workflow such that the worker container executes with a same directory structure as the workflow; and executing the second penetration testing tool.

10. The computer-implemented method of claim 9, determining a connection type of the first penetration testing tool.

11. The computer-implemented method of claim 10, further comprising generating a connection for at least one penetration testing tool that is compatible with the connection type.

12. The computer-implemented method of claim 9, further comprising mapping a first job identifier of the first worker container to the first runtime.

13. The computer-implemented method of claim 9, further comprising:

receiving a request for a status of the first penetration testing tool;

determining the first runtime based on a mapped first job identifier; and providing a response to the request based on the determined first runtime.

14. The computer-implemented method of claim 9, further comprising:

determining that the first runtime has terminated before the first worker container terminates; and re-starting the first runtime.

15. The computer-implemented method of claim 14, further comprising re-starting the first penetration testing tool.

16. A computer program product comprising program instructions stored on a computer readable storage medium, the program instructions executable by a processor to cause the processor to perform a method comprising:

receiving a submitted workflow for penetration testing, wherein the submitted workflow comprises execution instructions for a plurality of penetration testing tools on an infrastructure;

providing the submitted workflow for a workflow runtime manager;

creating individual nodes adaptable to operate on different systems;

customizing a workflow using the individual nodes needed for a penetration test on the infrastructure wherein workflow executes script that runs the nodes as individual processes;

deploying the workflow on the infrastructure in a cloud environment;

generating, by the workflow runtime manager, a first worker container that executes a first penetration testing tool of the plurality of penetration testing tools, using a first runtime, wherein the first penetration testing tool customizes workflow to needs of a client using remote desktop protocol;

executing the first penetration testing tool;

generating, by the workflow runtime manager, a second worker container that executes a second penetration testing tool of the plurality of penetration testing tools, using a second runtime;

associating, with each generated worker container, a persistent volume claim comprising resources of the submitted workflow such that the worker container executes with a same directory structure as the workflow; and executing the second penetration testing tool.

17. The computer program product of claim 16, the method further comprising determining a connection type of the first penetration testing tool.

18. The computer program product of claim 17, the method further comprising generating a connection for at least one penetration testing tool that is compatible with the connection type.

19. The computer program product of claim 16, the method further comprising mapping a first job identifier of the first worker container to the first runtime.

20. The computer program product of claim 16, the method further comprising:

receiving a request for a status of the first penetration testing tool;

determining the first runtime based on a mapped first job identifier; and providing a response to the request based on the determined first runtime.

* * * * *